United States Patent
Ozawa (10) Patent No.: US 8,811,416 B2
(45) Date of Patent: Aug. 19, 2014

(54) GATEWAY DEVICE, MOBILE TERMINAL, MOBILE COMMUNICATION METHOD, AND PROGRAM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 215 days.

(21) Appl. No.: 13/508,226

(22) PCT Filed: Nov. 2, 2010

(86) PCT No.: PCT/JP2010/069495
§ 371 (c)(1),
(2), (4) Date: May 4, 2012

(87) PCT Pub. No.: WO2011/055721
PCT Pub. Date: May 12, 2011

(65) Prior Publication Data
US 2012/0218899 A1    Aug. 30, 2012

(30) Foreign Application Priority Data
Nov. 4, 2009    (JP) .................................. 2009-253288

(51) Int. Cl.
| | |
|---|---|
| *H04L 12/28* | (2006.01) |
| *H04W 4/18* | (2009.01) |
| *H04M 7/12* | (2006.01) |
| *H04L 29/06* | (2006.01) |
| *H04M 7/00* | (2006.01) |
| *H04W 88/16* | (2009.01) |
| *H04W 28/02* | (2009.01) |
| *H04W 28/22* | (2009.01) |
| *H04L 12/56* | (2006.01) |
| *H04W 88/12* | (2009.01) |
| *H04W 88/18* | (2009.01) |

(52) U.S. Cl.
CPC ................ *H04W 4/18* (2013.01); *H04M 7/125* (2013.01); *H04W 88/16* (2013.01); *H04W 28/02* (2013.01); *H04W 28/22* (2013.01); *H04L 65/103* (2013.01); *H04M 7/123* (2013.01); *H04L 65/1016* (2013.01); *H04L 47/26* (2013.01); *H04M 7/1235* (2013.01); *H04M 7/0072* (2013.01); *H04L 65/605* (2013.01); *H04M 2207/187* (2013.01); *H04W 88/12* (2013.01); *H04W 88/181* (2013.01)
USPC .......................................... 370/401; 370/465

(58) Field of Classification Search
None
See application file for complete search history.

(56) References Cited

U.S. PATENT DOCUMENTS 7,197,307 B2 *  3/2007  Kirla .............................. 455/436
7,599,660 B2 * 10/2009  Fujishima ...................... 455/17
(Continued)

FOREIGN PATENT DOCUMENTS

| JP | 11-341063 | 12/1999 |
|---|---|---|
| JP | 2003-115849 | 4/2003 |

(Continued)

OTHER PUBLICATIONS

International Search Report, PCT/JP2010/069495, Feb. 1, 2011.
(Continued)

*Primary Examiner* — Robert Wilson
(74) *Attorney, Agent, or Firm* — Young & Thompson (57) ABSTRACT

A gateway device connects a packet transfer device on a mobile high-speed network and a radio network controller on a mobile circuit-switched network via an IMS network, and if the gateway device receives from the packet transfer device a request signal for changing a bit rate of audio, the gateway device converts an audio compressed-and-encoded bit stream, stored in a packet transmitted from the packet transfer device or the radio network controller, into a bit rate requested in the request signal and transmits the converted bit stream to the radio network controller or the packet transfer device.

19 Claims, 3 Drawing Sheets

(56) References Cited

U.S. PATENT DOCUMENTS

| | | |
|---|---|---|
| 2007/0025301 A1* | 2/2007 | Petersson et al. .............. 370/338 |
| 2010/0105385 A1 | 4/2010 | Tanabe et al. |
| 2010/0189035 A1 | 7/2010 | Pehrsson et al. |
| 2010/0246530 A1 | 9/2010 | Pehrsson et al. |
| 2011/0051696 A1* | 3/2011 | Shinoda et al. ............... 370/336 |
| 2011/0320192 A1* | 12/2011 | Ozawa ........................... 704/201 |
| 2012/0210381 A1* | 8/2012 | Ozawa ........................... 725/114 |
| 2012/0218899 A1* | 8/2012 | Ozawa ........................... 370/237 |
| 2013/0242741 A1* | 9/2013 | Ozawa ........................... 370/235 |

FOREIGN PATENT DOCUMENTS

| | | |
|---|---|---|
| JP | 2007-259128 | 10/2007 |
| WO | WO 2008/114823 | 9/2008 |
| WO | WO 2008/148430 | 12/2008 |
| WO | WO 2009/000318 | 12/2008 |

OTHER PUBLICATIONS

J. Sjoberg et al., Real-Time Transport Protocol (RTP) Payload Format and File Storage Format for the Adaptive Multi-Rate (AMR) and Adaptive Multi-Rate Wideband (AMR-WB) Audio Codecs, RFC 3267, Standards Track, RTP Payload Format for AMR and AMR-WB, Jun. 2002, pp. 1-44.

* cited by examiner

GATEWAY DEVICE, MOBILE TERMINAL, MOBILE COMMUNICATION METHOD, AND PROGRAM

REFERENCE TO RELATED APPLICATION

The present invention is based upon and claims the benefit of the priority of Japanese patent application No. 2009-253288, filed on Nov. 4, 2009, the disclosure of which is incorporated herein in its entirety by reference thereto.

TECHNICAL FIELD

The present invention relates to a gateway device, a mobile terminal, a mobile communication method, and a program. In particular, it relates to a gateway device, a mobile communication method, and a program for interconnecting a mobile terminal connected to a mobile high-speed network and a mobile terminal connected to a mobile circuit-switched network and realizing audio communication between the mobile terminals.

BACKGROUND

Currently, mobile terminals and mobile networks using wideband code division multiple access (W-CDMA) technology of the third generation realize voice calls based on a circuit-switched (CS) system. Meanwhile, in response to the trend of mobile core networks toward use of Internet protocol (IP), circuit switched over IP network (CSIP) is appearing. Based on CSIP, a circuit-switched signal is converted into an IP signal, and the IP signal is then connected to an IP multimedia subsystem (IMS) network. In the circuit-switched network, an integrated services digital network (ISDN) user part (ISUP) call control signal and an audio compressed-and-encoded bit stream are transmitted and received by an asynchronous transmission mode (ATM) bearer. However, in the IMS network, a session initiation protocol (SIP) signal is used for session control, and an audio compressed-and-encoded bit stream is transmitted and received after stored in a real-time transport protocol (RTP) packet.

It is conceivable that mobile networks will be further improved in speed and capacity through research and development, based on IP. In fact, high speed downlink packet access (HSDPA), high speed packet access, HSPA+, evolution-data optimized (only) Rev.A (EVDO Rev. A), and EVDO Rev.B have already been in practical use as mobile high-speed networks.

In addition, long term evolution (LTE) aiming at 100 Mbps (Megabit per second) or greater in the downlink direction and 50 Mbps or greater in the uplink direction and evolved packet core (EPC) as an IP backbone network supporting LTE are expected to be introduced as mobile high-speed networks.

Audio communication needs to be continuously supported for mobile terminals connected to these LTE and EPC. In LTE and EPC, RTP packets are used to execute voice over IP (VoIP) audio communication. In addition, the LTE section is expected to include a function of changing an audio encoding bit rate when network congestion is detected.

Patent Document 1 discloses a delivery server apparatus converting stream media data into a false stream and delivering the false stream, to provide mobile communication terminals, without inconvenience, with information delivery services using resource description framework (RDF) site summary (RSS) feed for personal computer terminals.

In addition, Patent Document 2 discloses a stream delivery apparatus adjusting a dynamic transmission rate while maintaining a real time property and quality as much as possible, even when the load of a network or a system is fluctuated.

Patent Document 1: Japanese Patent Kokai Publication No. 2007-259128A
Patent Document 2: Japanese Patent Kokai Publication No. JP-H11-341063A

SUMMARY

The entire disclosures of Patent Documents 1 and 2 are incorporated herein by reference thereto. Analysis will be hereinafter made based on the present invention.

If LTE or EPC is introduced, until all the existing mobile terminals are replaced by mobile terminals supporting LTE or EPC using VoIP, both of the mobile terminals that are connected to the mobile LTE/EPC network and that execute VoIP audio communication and the mobile terminals that are connected to an existing mobile circuit-switched network and that execute circuit-switched audio communication are used. Thus, it is necessary to interconnect the audio communication in the mobile circuit-switched network and the VoIP audio communication in the mobile LTE/EPC network. In addition, the third generation partnership project (3GPP) is discussing a Rate Adaptation function. With this function, when an evolved Node B (eNodeB) device detects network congestion in the LTE section, the eNodeB notifies a mobile terminal of occurrence of the congestion, and when the mobile terminal receives the notification, the mobile terminal transmits a request of changing an audio codec bit rate to the network.

However, currently, there is no gateway device available that interconnects new mobile terminals connected to the mobile LTE/EPC network and existing mobile terminals connected to the mobile circuit-switched network. Thus, audio communication between these new and existing mobile terminals cannot be interconnected. As a result, wide-spread use of new mobile terminals is hindered.

In addition, even if new mobile terminals connected to the mobile LTE/EPC network include the rate adaptation function of changing the audio codec bit rate when congestion in the LTE section is detected, existing mobile terminals connected to the existing mobile circuit-switched network do not include this function. Thus, if the LTE network is congested and at least one of the transmission bit rate and the reception bit rate of a new mobile terminal needs to be changed, these bit rates cannot be changed. Thus, congestion in the LTE section cannot be avoided, packet loss is caused in the LTE section, and the new or existing mobile terminal receives an interrupted audio signal, resulting in degradation of audio quality.

Therefore, there is a need in the art to provide a gateway device, a mobile terminal, a mobile communication method, and a program that prevent such degradation of audio quality between a mobile terminal connected to a mobile high-speed network and a mobile terminal connected to a mobile circuit-switched network.

According to a first aspect of the present invention, there is provided a gateway device that connects a packet transfer device on a mobile high-speed network and a radio network controller on a mobile circuit-switched network via an IMS network, wherein if the gateway device receives from the packet transfer device a request signal for changing a bit rate of audio, the gateway device converts an audio compressed-and-encoded bit stream, stored in a packet transmitted from the packet transfer device or the radio network controller, into a bit rate requested in the request signal and transmits the converted bit stream to the radio network controller or the packet transfer device.

According to the present invention, the following mobile communication method is provided.

According to a second aspect of the present invention, there is provided a mobile communication method comprising:
by a gateway device, connecting a packet transfer device on a mobile high-speed network and a radio network controller on a mobile circuit-switched network via an IP multimedia subsystem (IMS) network; and
if the gateway device receives from the packet transfer device a request signal for changing a bit rate of audio, converting an audio compressed-and-encoded bit stream, stored in a packet transmitted from the packet transfer device or the radio network controller, into a bit rate requested in the request signal and transmitting the converted bit stream to the radio network controller or the packet transfer device.

According to the present invention, the following program is provided.

According to a third aspect of the present invention, there is provided a program causing a computer to execute:
connecting a packet transfer device on a mobile high-speed network and a radio network controller on a mobile circuit-switched network via an IP multimedia subsystem (IMS) network; and if the computer receives from the packet transfer device a request signal for changing a bit rate of audio, converting an audio compressed-and-encoded bit stream, stored in a packet transmitted from the packet transfer device or the radio network controller, into a bit rate requested in the request signal and transmitting the converted bit stream to the radio network controller or the packet transfer device.

According to a fourth aspect of the present invention, there is provided a mobile communication system, comprising:
a gateway device that connects a packet transfer device on a mobile high-speed network and a radio network controller on a mobile circuit-switched network via an IP multimedia subsystem (IMS) network;
a mobile terminal, connected to the mobile high-speed network and executing audio communication with a mobile terminal connected to the mobile circuit-switched network via the gateway device, wherein if the gateway device receives from the packet transfer device a request signal for changing a bit rate of audio, the gateway device converts an audio compressed-and-encoded bit stream, stored in a packet transmitted from the packet transfer device or the radio network controller, into a bit rate requested in the request signal and transmits the converted bit stream to the radio network controller or the packet transfer device.

The present invention provides the following advantage, but not restricted thereto. A gateway device, a mobile communication method, and a program according to the present invention can prevent degradation of audio quality between a mobile terminal connected to a mobile high-speed network and a mobile terminal connected to a mobile circuit-switched network.

PREFERRED MODES

In the present disclosure, there are various possible modes, which include the following, but not restricted thereto.

According to the present invention, the following modes are possible. A gateway device of a first applicable mode may be the gateway device according to the first aspect.

In a gateway device of a second applicable mode, if the gateway device receives from the packet transfer device a request signal for changing a bit rate of audio that is transmitted from a mobile terminal connected to the mobile high-speed network, the gateway device may convert an audio compressed-and-encoded bit stream stored in a packet transmitted from the packet transfer device into a bit rate transmittable and receivable by a mobile terminal connected to the radio network controller and transmit the converted bit stream to the radio network controller.

In a gateway device of a third applicable mode, if the gateway device receives from the packet transfer device a request signal for changing a bit rate of audio that is transmitted to a mobile terminal connected to the mobile high-speed network, the gateway device may convert an audio compressed-and-encoded bit stream transmitted from the radio network controller into a bit rate requested in the request signal and transmit the converted bit stream to the packet transfer device.

A gateway device of a fourth applicable mode may receive the request signal transmitted from the packet transfer device via a session control device on the IMS network.

In a gateway device of a fifth applicable mode, if the gateway device receives the request signal, the gateway device may notify the packet transfer device or the session control device of an acknowledgement.

In a gateway device of a sixth applicable mode, if congestion is caused in the mobile high-speed network, the request signal may be transmitted by a mobile terminal connected to the mobile high-speed network.

In a gateway device of a seventh applicable mode, occurrence of congestion in the mobile high-speed network may be detected by an eNodeB device on the mobile high-speed network.

In a gateway device of an eighth applicable mode, the eNodeB device may use explicit congestion notification-congestion experienced (ECN-CE) information to notify a mobile terminal of the occurrence of congestion.

In a gateway device of a ninth applicable mode, the request signal may be stored in codec mode request (CMR) of request for comments (RFC) 3267.

Based on a gateway device of a tenth applicable mode, it is preferable that the mobile high-speed network comprise LTE (Long Term Evolution) or EPC (Evolved Packet Core).

A mobile terminal of an eleventh applicable mode may be connected to the mobile high-speed network and execute audio communication with a mobile terminal connected to the mobile circuit-switched network via the above gateway device.

A mobile communication system of a twelfth applicable mode may comprise the above gateway device and a mobile terminal connected to the mobile high-speed network.

A mobile communication method of a thirteenth applicable mode may be a mobile communication method according to the second aspect.

A mobile communication method of a fourteenth applicable mode may comprise, if the gateway device receives from the packet transfer device a request signal for changing a bit rate of audio that is transmitted from a mobile terminal connected to the mobile high-speed network, by the gateway device, converting an audio compressed-and-encoded bit stream stored in a packet transmitted from the packet transfer device into a bit rate transmittable and receivable by a mobile terminal connected to the radio network controller and transmitting the converted bit stream to the radio network controller.

A mobile communication method of a fifteenth applicable mode may comprise, if the gateway device receives from the packet transfer device a request signal for changing a bit rate of audio that is transmitted to a mobile terminal connected to the mobile high-speed network, by the gateway device, converting an audio compressed-and-encoded bit stream transmitted from the radio network controller into a bit rate requested in the request signal and transmitting the converted bit stream to the packet transfer device.

A program of a sixteenth applicable mode may be the program according to the third aspect.

A program of a seventeenth applicable mode may cause the computer to execute, if the computer receives from the packet transfer device a request signal for changing a bit rate of audio that is transmitted from a mobile terminal connected to the mobile high-speed network, converting an audio compressed-and-encoded bit stream stored in a packet transmitted from the packet transfer device into a bit rate transmittable and receivable by a mobile terminal connected to the radio network controller and transmitting the converted bit stream to the radio network controller.

A program of an eighteenth applicable mode may causing the computer to execute, if the computer receives from the packet transfer device a request signal for changing a bit rate of audio that is transmitted to a mobile terminal connected to the mobile high-speed network, converting an audio compressed-and-encoded bit stream transmitted from the radio network controller into a bit rate requested in the request signal and transmitting the converted bit stream to the packet transfer device.

The above program may be stored in a computer-readable recording medium.

The present invention enables interconnection between a mobile terminal that is connected to a mobile circuit-switched network and that executes circuit-switched audio communication and a mobile terminal that is connected to a mobile high-speed network (a mobile LTE/EPC network, for example) and that executes VoIP communication.

In addition, if a new mobile terminal connected to a mobile high-speed network includes a rate adaptation function of changing an audio codec bit rate based on notification of congestion in the LTE section, a gateway device according to the present invention can receive a compressed-and-encoded bit stream from the new mobile terminal that has changed the bit rate. In addition, the gateway device according to the present invention can transmit a compressed-and-encoded bit stream converted based on the changed bit rate to a new mobile terminal. In this way, congestion in the LTE section is avoided, occurrence of packet loss is prevented, and the new or existing mobile terminal receives no interrupted audio signal. As a result, degradation of audio quality can be prevented.

First Exemplary Embodiment

Figure 1:
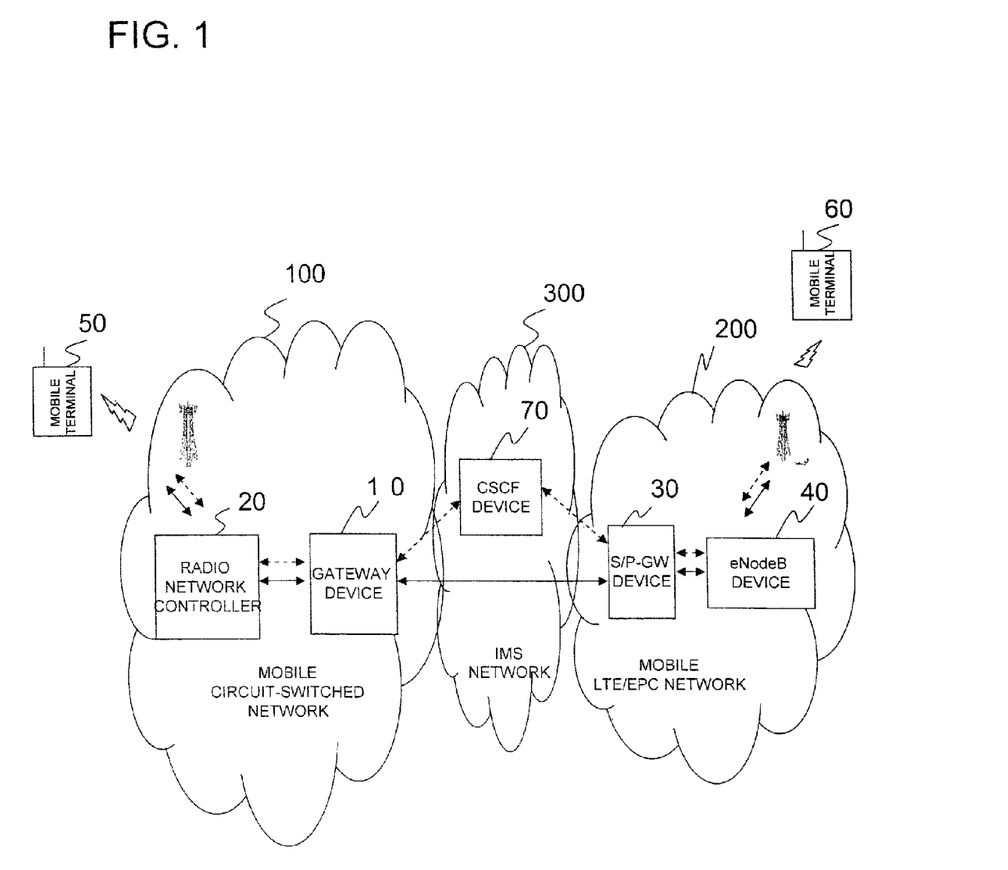
FIG. 1 illustrates a network configuration of a mobile communication system including a gateway device according to a first exemplary embodiment.

A gateway device according to a first exemplary embodiment will be described with reference to the drawings. FIG. 1 illustrates a network configuration and a connection mode of a mobile communication system including a gateway device 10 according to the present exemplary embodiment. In FIG. 1, the mobile communication system includes: the gateway device 10 and a radio network controller (RNC) 20 provided in a mobile circuit-switched network 100; a CSCF device provided in an IMS network 300; an serving/packet data network-gateway (S/P-GW) device 30 and an eNodeB device 40 provided in a mobile LTE/EPC network 200; and mobile terminals 50 and 60.

The present exemplary embodiment uses the mobile LTE/EPC network 200 as a mobile high-speed network. Alternatively, HSPA or HSPA+ may be used as a mobile high-speed network. The gateway device 10 according to the present exemplary embodiment interconnects a packet transfer device on the mobile LTE/EPC network 200 and the RNC 20 on the mobile circuit-switched network 100 via the IMS network 300, to realize interconnection of audio communication between the mobile terminal 60 connected to the mobile LTE/EPC network 200 and the mobile terminal 50 connected to the RNC 20.

Session initiation protocol (SIP) used in IP multimedia subsystem (IMS) and VoIP is used for a call control signal between the gateway device 10 and the packet transfer device connected to the mobile LTE/EPC network 200. The call control signal is transferred by an LTE/EPC bearer. An audio signal between the gateway device 10 and the packet transfer device is transferred by using an RTP/UDP/IP packet. The present exemplary embodiment uses the serving/packet data network-gateway (S/P-GW) device as the packet transfer device. Alternatively, an xGSN device may be used as the packet transfer device.

For example, the Iu U-plane (IuUP) protocol, which is a circuit-switched protocol, is used to transfer an audio signal between the gateway device 10 and the RNC 20 in the mobile circuit-switched network 100.

The mobile terminal 50 is a voice telephone terminal connected to the mobile circuit-switched network 100. An existing voice telephone terminal can be used as the mobile terminal 50, without modification. The mobile terminal 50 is connected to the mobile circuit-switched network 100 and transmits and receives a call control signal and an audio signal to and from the gateway device 10 via the RNC 20.

For example, the mobile terminal 50 includes an adaptive multi-rate (AMR) audio codec as an audio codec and transmits and receives a bit stream obtained by compressing and encoding an audio signal at a bit rate of 12.2 kbps. Details of the AMR audio codec are defined by TS26.090 standards of the third generation partnership project (3GPP).

For example, the gateway device 10 transmits and receives integrated services digital network user part (ISUP) as a call processing signal used in the mobile circuit-switched network 100 and an AMR compressed-and-encoded bit stream as audio data to and from the mobile terminal 50. In addition, to interconnect the mobile circuit-switched network 100 and the IMS network 300, the gateway device 10 converts the above call processing signal into a SIP signal and outputs the SIP signal to the call session control function (CSCF) device (session control device) 70 on the IMS network. The CSCF device 70 outputs the SIP signal to the S/P-GW device 30 on the mobile LTE/EPC network 200. The S/P-GW device 30 uses the GPRS tunneling protocol-C (GTP-C) protocol to transfer the call control signal to the eNodeB device 40 by tunneling. Next, the eNodeB device 40 transmits the signal to the mobile terminal 60 via a radio section.

In the reverse direction, the mobile terminal 60 transmits a SIP control signal to the eNodeB 40 via a radio section. Next, the S/P-GW device 30 uses the GTP-C to transfer the SIP signal to the CSCF device 70 by tunneling. The CSCF device 70 transmits the SIP call control signal to the gateway device 10, which converts the signal into ISUP or the like. The gateway device 10 outputs the converted signal to the RNC 20, and the mobile terminal 50 receives the signal via a radio section.

Next, a U-plane audio signal will be described. The mobile terminal 50 transmits an AMR-compressed audio bit stream of 12.2 kbps to the RNC 20 via a radio section. The RNC 20 stores the stream in an IuUP protocol frame and transmits the IuUP protocol frame to the gateway device 10. The IuUP protocol is defined by TS25.415 or TS26.102 standards of the 3GPP.

The gateway device 10 extracts the AMR bit stream from the IuUP protocol frame, stores the AMR bit stream in an RTP packet payload, and transfers the AMR bit stream as an RTP/UDP/IP packet to the S/P-GW device 30 in the mobile LTE/EPC network 200 via the IMS network 300. After receiving the RTP/UDP/IP packet and adding a GTP-U header to an RTP packet payload portion, the S/P-GW device 30 transfers the packet as a GTP-U/UDP/IP packet to the eNodeB device 40 by tunneling. The eNodeB device 40 extracts the GTP-U packet payload portion and transmits the packet as an RTP packet to the mobile terminal 60 via a radio section. The mobile terminal 60 receives the RTP packet, extracts the AMR bit stream, and executes AMR decoding to reproduce the audio signal. Since data flows from the mobile terminal 60 to the mobile terminal 50 in the direction opposite to the above direction, description of the opposite direction will be omitted.

The gateway device 10 according to the present exemplary embodiment has a function of changing the AMR transmission/reception bit rate of the mobile terminal 60 when the mobile LTE/EPC network 200 detects traffic congestion in the LTE section. However, since the mobile terminal 50 is an existing mobile terminal using the circuit switched system, the AMR is fixed at 12.2 kbps. Thus, an audio transcoder of the gateway device 10 converts the bit rate, in accordance with change of the bit rate of the mobile terminal 60. The conversion can be realized as follows.

The mobile terminal 60 and the gateway device 10 use SIP/SDP to describe presence of an AMR bit rate conversion capability in SDP. By using an SDP offer/answer process, the mobile terminal 60 and the gateway device 10 exchange information about the capability. Specifically, the mobile terminal 60 transmits an offer describing ecn-capable-rtp based on SDP to the gateway device 10. In response, the gateway device 10 transmits an answer describing ecn-capable-rtp based on SDP. Through this process, the mobile terminal 60 and the gateway device 10 recognize that the mobile terminal 60 and the gateway device 10 are capable of changing the AMR bit rate.

If the eNodeB device 40 detects congestion in the LTE section in the mobile LTE/EPC network 200, the eNodeB device 40 sets an explicit congestion notification-congestion experienced (ECN-CE) flag in an IP header of a packet and transmits the packet to the mobile terminal 60. If the ECN-CE flag is set in the IP header of the packet transmitted from the eNodeB device 40, the mobile terminal 60 determines occurrence of congestion in the LTE section in the mobile LTE/EPC network 200. In such case, for example, the mobile terminal 60 determines to decrease the AMR bit rate from 12.2 kbps to 7.95 kbps, describes change of the bit rate and the changed bit rate in an adaptation request signal, and transmits the adaptation request signal to the gateway device 10.

Figure 2:
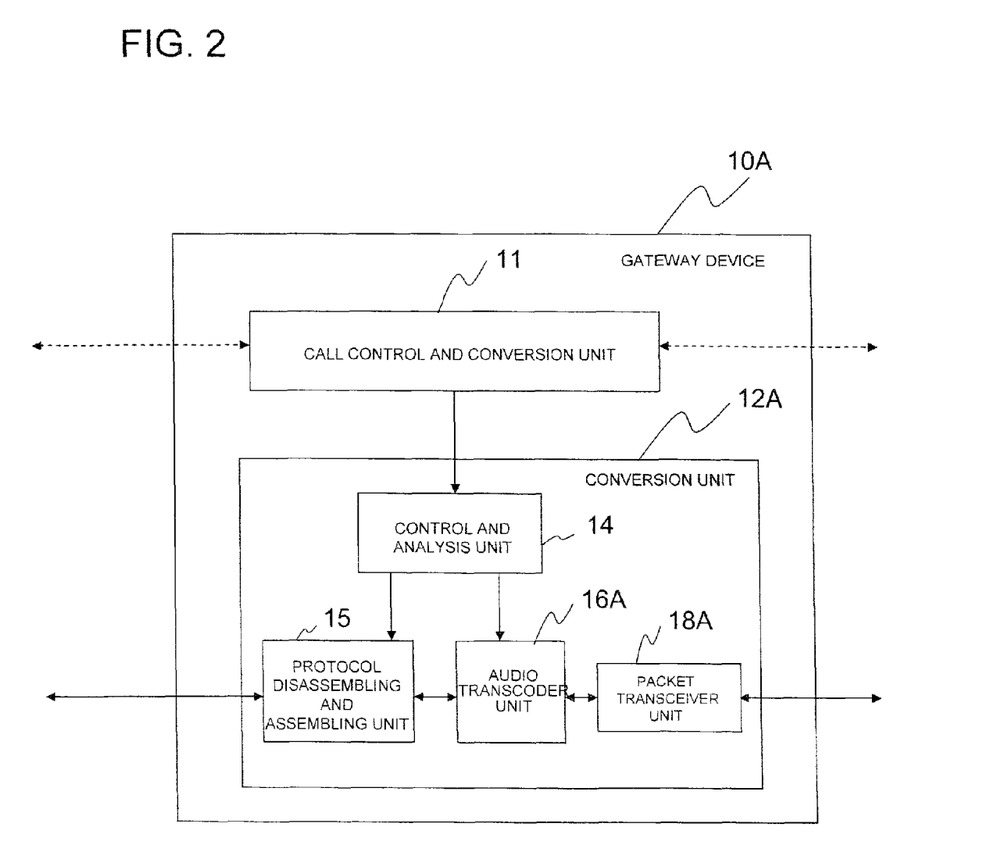
FIG. 2 is a block diagram illustrating a configuration of the gateway device according to the first exemplary embodiment.

FIG. 2 is a block diagram illustrating a configuration of a gateway device 10A (the gateway device 10 in FIG. 1) according to the present exemplary embodiment. In FIG. 2, the gateway device 10A includes a call control and conversion unit 11 and a conversion unit 12A. The conversion unit 12A includes a control and analysis unit 14, a protocol disassembling and assembling unit 15, an audio transcoder unit 16A, and a packet transceiver unit 18A.

First, an operation executed when the LTE section is not congested will be described. The call control and conversion unit 11 receives a SIP call control signal from the CSCF device 70 on the IMS network 300, converts the signal into an ISUP signal used with the mobile circuit switched system, and transmits the ISUP signal to the RNC 20 on the mobile circuit-switched network 100. Next, after determining that no adaptation request signal is transmitted from the CSCF device 70, the call control and conversion unit 11 instructs the control and analysis unit 14 to start communication with an allocated channel.

When receiving the instructions for starting communication from the call control and conversion unit 11, if the control and analysis unit 14 does not receive an adaptation request signal, the control and analysis unit 14 determines that both the mobile terminals 60 and 50 use the same AMR bit rate of 12.2 kbps. Thus, the control and analysis unit 14 instructs the audio transcoder unit 16A to execute no conversion process. In addition, the control and analysis unit 14 instructs the protocol disassembling and assembling unit 15 to disassemble and assemble the IuUP protocol.

The packet transceiver unit 18A receives an RTP/UDP/IP packet storing an AMR compressed-and-encoded bit stream of 12.2 kbps from the S/P-GW device 30 and outputs the bit stream to the audio transcoder unit 16A. In accordance with the instructions from the control and analysis unit 14, the audio transcoder unit 16A executes no conversion process. Namely, the audio transcoder unit 16A outputs the AMR compressed-and-encoded bit stream of 12.2 kbps to the protocol disassembling and assembling unit 15, without executing any conversion. The protocol disassembling and assembling unit 15 stores the AMR compressed-and-encoded bit stream of 12.2 kbps transmitted from the audio transcoder unit 16A in a payload portion in IuUP frame format and transmits the IuUP frame to the RNC 20.

Next, an operation in the reverse direction executed when the LTE section is not congested will be described. Regarding the C-Plane, the call control and conversion unit 11 receives an ISUP signal from the RNC 20, converts the signal into a SIP/SDP signal, and transmits the SIP/SDP signal to the S/P-GW device 30 via the CSCF device 70. The S/P-GW device 30 uses the GTP-C protocol to transfer the SIP/SDP signal to the eNodeB device 40 by tunneling. The eNodeB device 40 extracts the SIP/SDP signal from the GTP-C packet and transmits the SIP/SDP signal to the mobile terminal 60 via an LTE radio section. The mobile terminal 60 receives the SIP/SDP signal to control the session and to control the transmission and reception of audio signals.

Regarding the U-Plane, the protocol disassembling and assembling unit 15 receives an IuUP frame protocol from the RNC 20, reads an AMR compressed-and-encoded bit stream of 12.2 kbps stored in a payload, and outputs the bit stream to the audio transcoder unit 16A. The audio transcoder unit 16A transmits the AMR compressed-and-encoded stream of 12.2 kbps to the packet transceiver unit 18A, without executing any conversion. The packet transceiver unit 18A stores the AMR compressed-and-encoded bit stream of 12.2 kbps in a payload of an RTP packet and transmits the packet to the S/P-GW device 30. For example, RFC3267 of Internet engineering task force (IETF) can be used as the RTP payload format.

Next, an operation executed when the eNodeB device 40 detects congestion in the LTE section will be described. If the call control and conversion unit 11 of the gateway device 10 receives ECN-capable-rtp based on SIP/SDP from the mobile terminal 60 via the CSCF device 70, the call control and conversion unit 11 transmits an answer describing ECN-capable-rtp based on SDP to the S/P-GW device 30 via the CSCF device 70.

Next, if the call control and conversion unit 11 receives an adaptation request signal from the mobile terminal 60 via the CSCF device 70, the call control and conversion unit 11 reads information about change of the AMR bit rate included in the adaptation request signal and outputs the information to the control and analysis unit 14, along with instructions for starting communication. In this case, for example, the information indicates change of the AMR bit rate from 12.2 kbps to 7.95 kbps. In addition, the call control and conversion unit 11 transmits an ACK signal to the S/P-GW device 30 via the CSCF device 70.

Upon receiving the instructions for starting communication and the information about change of the AMR bit rate, if the bit rate needs to be changed from 12.2 kbps to 7.95 kbps in both of the uplink and downlink directions, an audio transcoder is necessary. Thus, the control and analysis unit 14 instructs the audio transcoder unit 16A to execute transcoding and to execute conversion from 12.2 kbps to 7.95 kbps.

Upon receiving the instructions for starting communication, for transcoding, and for the bit rate conversion, the audio transcoder unit 16A activates an AMR transcoder in both directions to convert the bit rate from 12.2 kbps to 7.95 kbps. The audio transcoder unit 16A receives an RTP packet from the packet transceiver unit 18A, converts an AMR bit stream stored in the RTP packet from 7.95 kbps into 12.2 kbps, and outputs the converted bit stream to the protocol disassembling and assembling unit 15.

The protocol disassembling and assembling unit 15 stores the AMR bit stream of 12.2 kbps transmitted from the audio transcoder unit 16A in a payload portion of an IuUP circuit-switched protocol frame and transmits the packet to the RNC 20. Specifically, the protocol disassembling and assembling unit 15 reads codec mode request (CMR) of an RFC3267 RTP payload format header, assembles an IuUP circuit-switched protocol frame based on CMR, stores the AMR compressed-and-encoded stream in RAB SubFlow of an IuUP payload portion, and transmits the packet to the RNC 20 via a circuit-switched bearer.

Next, the reverse direction will be described. The protocol disassembling and assembling unit 15 converts an IuUP protocol frame transmitted from the RNC 20 into an RFC3267 protocol. Specifically, first, the protocol disassembling and assembling unit 15 reads the AMR compressed-and-encoded bit stream of 12.2 kbps stored in radio access bearer (RAB) subflow of an IuUP protocol frame payload portion and transmits the read bit stream to the audio transcoder unit 16A.

In accordance with instructions for starting communication and instructions for transcoding from the control and analysis unit 14, the audio transcoder unit 16A converts the AMR compressed-and-encoded bit stream transmitted from the protocol disassembling and assembling unit 15 from 12.2 kbps to 7.95 kbps and outputs the converted bit stream to the packet transceiver unit 18A.

The packet transceiver unit 18A establishes an RTP payload format header defined by IETF RFC3267 for the AMR compressed-and-encoded bit stream of 7.95 kbps and stores the AMR bit stream in an RTP payload portion.

Since frame type information included in the AMR audio compressed-and-encoded bit stream represents a bit rate, the protocol disassembling and assembling unit 15 converts this frame type information into CMR (Codec Mode Request) information of RFC3267. In addition, the protocol disassembling and assembling unit 15 sets octet-align and other parameters required for settings of RFC3267 to predetermined values.

The packet transceiver unit 18A transmits an RTP/user datagram protocol (UDP)/IP packet to the S/P-GW device 30 on the mobile LTE/EPC network 200 via the IMS network 300.

Second Exemplary Embodiment

Figure 3:
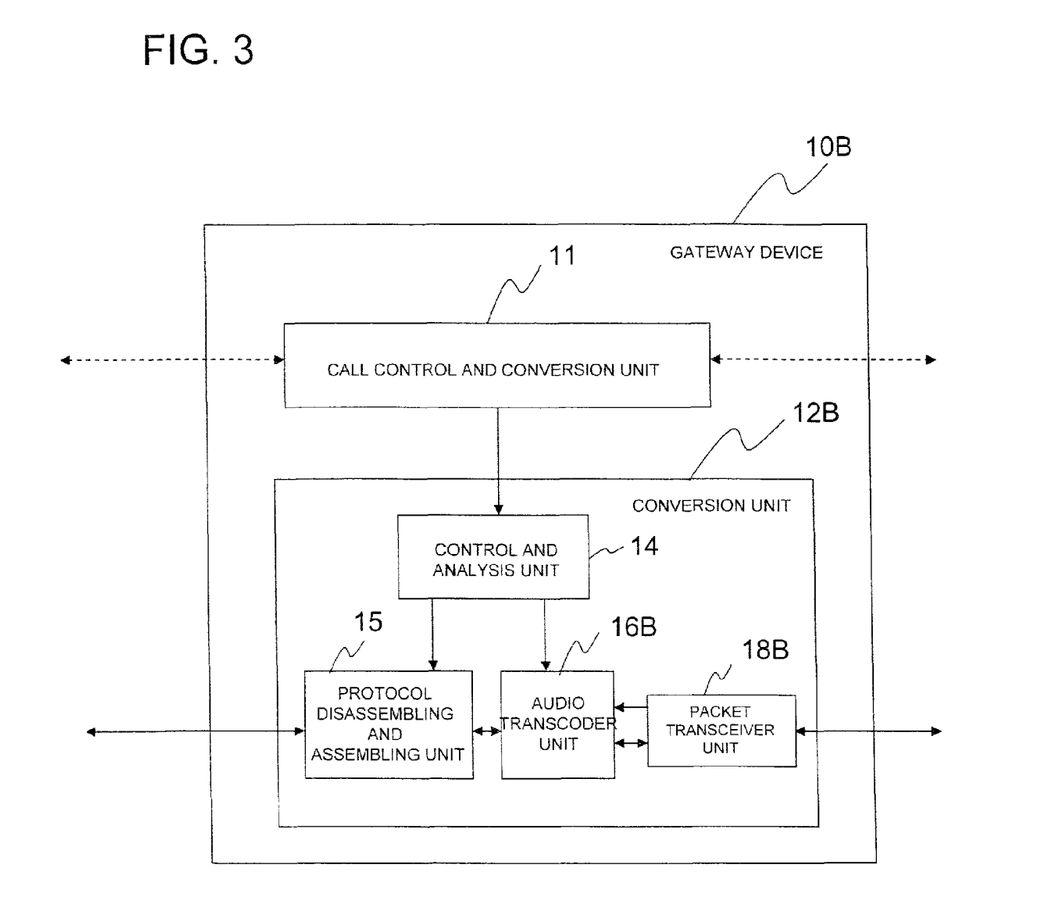
FIG. 3 is a block diagram illustrating a configuration of a gateway device according to a second exemplary embodiment.

A gateway device according to a second exemplary embodiment will be described with reference to the drawings. FIG. 3 is a block diagram illustrating a configuration of a gateway device 10B (the gateway device 10 in FIG. 1) according to the present exemplary embodiment. In FIG. 3, the gateway device 10B includes the call control and conversion unit 11 and a conversion unit 12B. The conversion unit 12B includes the control and analysis unit 14, the protocol disassembling and assembling unit 15, an audio transcoder unit 16B, and a packet transceiver unit 18B. In FIGS. 2 and 3, constituent elements denoted by the same reference characters operate in the same way. Thus, descriptions of these elements will be omitted.

In FIG. 3, if the mobile terminal 60 detects ECN-CE and changes the bit rate of an AMR audio encoded bit stream, the mobile terminal 60 uses an AMR audio codec thereof to change the bit rate to 7.95 kbps, for example. The mobile terminal 60 describes the changed bit rate (7.95 kbps) in a CMR field in RTP payload format defined by RFC3267 and transmits an RTP packet having an RTP payload storing the AMR compressed-and-encoded bit stream of 7.95 kbps to the gateway device 10 via the eNodeB device 40 and S/P-GW device 30. The packet transceiver unit 18B of the gateway device 10 receives the RTP packet from the packet transfer device 30, checks the CMR field of the RTP payload format portion, and recognizes that the AMR bit rate is 7.95 kbps. In addition, the packet transceiver unit 18B reads the AMR compressed-and-encoded bit stream from the RTP payload portion and outputs the bit rate information and the AMR compressed-and-encoded bit stream to the audio transcoder unit 16B.

After receiving the bit rate information and the AMR compressed-and-encoded bit stream and recognizing that the bit rate of the AMR compressed-and-encoded bit stream is 7.95 kbps, the audio transcoder unit 16B converts the AMR compressed-and-encoded bit stream to 12.2 kbps and outputs the converted bit stream to the protocol disassembling and assembling unit 15.

In the above first and second exemplary embodiments, a tandem transcoder formed by a combination of a full decoder and a full re-encoder may be used as the audio transcoder unit 16A/16B. Alternatively, a non-tandem transcoder that decodes and re-encodes only a part of an AMR compressed-and-encoded bit stream may be used. Compared with the former, the latter can reduce the processing delay and amount.

In the above first and second exemplary embodiments, other than AMR, a publicly known codec such as AMR-WB or G.711 may be used as an audio codec for generating an audio compressed-and-encoded bit stream.

In addition, a publicly known protocol such as GPRS tunneling protocol for user plane (GTP-U) may be used as a protocol for storing an audio compressed-and-encoded stream transmitted to and from the packet transfer device 30.

In addition, in the above first (or second) exemplary embodiment, the control and analysis unit 14 provided in the conversion unit 12A (or 12B) may be provided in the call control and conversion unit 11. In addition, the call control and conversion unit 11 and the conversion unit 12A (or 12B) may be provided separately in different units. If this configuration is used, for example, the ITU-T H.248 media gateway control (MEGACO) protocol may be used to transmit a control signal between the call control and conversion apparatus 11 and the conversion unit 12A (or 12B).

In addition, the audio transcoder unit 16A (or 16B) may be provided in a unit different from the gateway device 10A (or 10B).

In addition, other than LTE and EPC, examples of the mobile high-speed network include HSPA, HSPA+, Home NodeB (HNB), Home e-NodeB (HeNB), and worldwide interoperability for microwave access (WiMax).

In addition, in the above exemplary embodiments, a computer program that forms the gateway device 10A (or 10B) and that is executed on a computer may realize functions of the call control and conversion unit 11 and the individual units of the conversion unit 12A (or 12B) of the gateway device 10A (or 10B).

The entire disclosures of Patent Documents 1 and 2 are incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept.

EXPLANATIONS OF SYMBOLS

10, 10A, 10B gateway device
11 call control and conversion unit
12A, 12B conversion unit
14 control and analysis unit
15 protocol disassembling and assembling unit
16A, 16B audio transcoder unit
18A, 18B packet transceiver unit
20 radio network controller (RNC)
30 S/P-GW device
40 evolved Node B (eNodeB) device
50, 60 mobile terminal
70 CSCF device
100 mobile circuit-switched network
200 mobile LTE/EPC network
300 IMS network

The invention claimed is:

1. A gateway device configured to connect a packet transfer device on a mobile high-speed network and a radio network controller on a mobile circuit-switched network via an IP multimedia subsystem (IMS) network, the gateway device comprising:
a reception device configured to receive a request signal for changing a bit rate of audio from the packet transfer device;
one or more processing devices configured to convert an audio compressed-and-encoded bit stream, stored in a packet transmitted from the packet transfer device or the radio network controller, into a bit rate requested in the request signal when the gateway device receives the request signal for changing the bit rate of audio at the transmission and reception device; and
a transmission device configured to transmit the converted bit stream to the radio network controller or the packet transfer device.

2. The gateway device according to claim 1, wherein when the reception device of the gateway device receives from the packet transfer device the request signal for changing a bit rate of audio that is transmitted from a mobile terminal connected to the mobile high-speed network, the one or more processing devices converts the audio compressed-and-encoded bit stream stored in the packet transmitted from the packet transfer device into the bit rate transmittable and receivable by the mobile terminal connected to the radio network controller and the transmission device transmits the converted bit stream to the radio network controller.

3. The gateway device according to claim 2, wherein the reception device receives the request signal transmitted from the packet transfer device via a session control device on the IMS network.

4. The gateway device according to claim 2, wherein when the reception device receives the packet transfer request signal, the transmission device notifies the packet transfer device or the session control device of an acknowledgement.

5. The gateway device according to claim 1, wherein when the reception device of the gateway device receives from the packet transfer device the request signal for changing the bit rate of audio that is transmitted to a mobile terminal connected to the mobile high-speed network, the one or more processing devices converts the audio compressed-and-encoded bit stream transmitted from the radio network controller into the bit rate requested in the request signal and the transmission device transmits the converted bit stream to the packet transfer device.

6. The gateway device according to claim 5, wherein the reception device receives the packet transfer request signal transmitted from the packet transfer device via a session control device on the IMS network.

7. The gateway device according to claim 5, wherein when the reception device receives the packet transfer request signal, the transmission device notifies the packet transfer device or the session control device of an acknowledgement.

8. The gateway device according to claim 1, wherein the reception device receives the request signal transmitted from the packet transfer device via a session control device on the IMS network.

9. The gateway device according to claim 8, wherein when the reception device receives the packet transfer request signal, the transmission device notifies the packet transfer device or the session control device of an acknowledgement.

10. The gateway device according to claim 1, wherein when the reception device receives the request signal, the transmission device notifies the packet transfer device or the session control device of an acknowledgement.

11. The gateway device according to claim 1, wherein when congestion is caused in the mobile high-speed network, the request signal is transmitted by a mobile terminal connected to the mobile high-speed network.

12. The gateway device according to claim 11, wherein an occurrence of congestion in the mobile high-speed network is detected by an eNodeB device on the mobile high-speed network.

13. The gateway device according to claim 12, wherein the eNodeB device uses explicit congestion notification-congestion experienced (ECN-CE) information to notify a mobile terminal of the occurrence of congestion.

14. The gateway device according to claim 1, wherein the request signal is encoded in a codec mode request (CMR) format that meets the requirements defined in Request for Comment (RFC) 3267.

15. The gateway device according to claim 1, wherein the mobile high-speed network including the packet transfer device from which the gateway device receives the request signal comprises long term evolution (LTE) or evolved packet core (EPC).

16. A mobile communication system, comprising:
a gateway device that connects a packet transfer device on a mobile high-speed network and a radio network controller on a mobile circuit-switched network via an IP multimedia subsystem (IMS) network; and
a first mobile terminal, connected to the mobile high-speed network and executing audio communication with a second mobile terminal connected to the mobile circuit-switched network via the gateway device, wherein
when the gateway device receives from the packet transfer device a request signal for changing a bit rate of audio, the gateway device converts an audio compressed-and-encoded bit stream, stored in a packet transmitted from the packet transfer device or the radio network controller, into a bit rate requested in the request signal and transmits the converted bit stream to the radio network controller or the packet transfer device, and
upon receiving the converted bit stream, the packet transfer device or the radio network controller forwards the converted bit stream to the first mobile terminal or the second mobile terminal.

17. A mobile communication method, comprising:
connecting, by a gateway device, a packet transfer device on a mobile high-speed network and a radio network controller on a mobile circuit-switched network via an IP multimedia subsystem (IMS) network;
receiving, by the gateway device from the packet transfer device, a request signal for changing a bit rate of audio;
converting, by one or more processing devices of the gateway device, an audio compressed-and-encoded bit stream, stored in a packet transmitted from the packet transfer device or the radio network controller, into a bit rate requested in the request signal; and
transmitting the converted bit stream to the radio network controller or the packet transfer device.

18. The mobile communication method according to claim 17,
wherein when the gateway device receives from the packet transfer device the request signal for changing the bit rate of audio that is transmitted to a mobile terminal connected to the mobile high-speed network, the audio compressed-and-encoded bit stream transmitted from the radio network controller is converted, by the one or more processing devices of the gateway device, into the bit rate requested in the request signal, and the converted bit stream is transmitted to the packet transfer device.

19. The mobile communication method according to claim 17,
wherein when the gateway device receives from the packet transfer device the request signal for changing the bit rate of audio that is transmitted from a mobile terminal connected to the mobile high-speed network, the audio compressed-and-encoded bit stream stored in the packet transmitted from the packet transfer device is converted, by the one or more processing devices of the gateway device, into the bit rate that is transmittable and receivable by a mobile terminal connected to the radio network controller, and the converted bit stream is transmitted by the gateway device to the radio network controller.

* * * * *